United States Patent
Koukan

(10) Patent No.: US 9,061,581 B2
(45) Date of Patent: Jun. 23, 2015

(54) LIQUID CONTAINER FOR A MOTOR VEHICLE, IN PARTICULAR A FUEL CONTAINER

(75) Inventor: Ibrahim Koukan, Cologne (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 0 days.

(21) Appl. No.: 14/235,249

(22) PCT Filed: Jul. 25, 2012

(86) PCT No.: PCT/EP2012/003139
§ 371 (c)(1),
(2), (4) Date: Apr. 24, 2014

(87) PCT Pub. No.: WO2013/013818
PCT Pub. Date: Jan. 31, 2013

(65) Prior Publication Data
US 2014/0231424 A1    Aug. 21, 2014

(30) Foreign Application Priority Data
Jul. 25, 2011    (DE) .......................... 10 2011 108 333

(51) Int. Cl.
B60K 15/035    (2006.01)
(52) U.S. Cl.
CPC .......... B60K 15/03504 (2013.01); B60K 15/035 (2013.01); *B60K 2015/03514* (2013.01); *B60K 2015/03566* (2013.01)
(58) Field of Classification Search
CPC .............. B60K 15/03504; B60K 2015/03566; B60K 15/035; B60K 15/03519; B60K 2015/03561
USPC ............. 220/86.3, 86.2, 86.1, 562, 4.14, 749, 220/746, 745; 137/152, 123
See application file for complete search history.

(56) References Cited

U.S. PATENT DOCUMENTS

| 4,700,864 A | 10/1987 | Galles et al. |
| 5,215,132 A * | 6/1993 | Kobayashi ................ 141/302 |

(Continued)

FOREIGN PATENT DOCUMENTS

| DE | 102005043745 A1 | 3/2007 |
| DE | 102005053816 A1 | 5/2007 |

(Continued)

OTHER PUBLICATIONS

English language PCT International Search Report mailed Nov. 23, 2012, received in corresponding PCT Application No. PCT/EP12/03139, 3 pgs.

(Continued)

*Primary Examiner* — Robert J Hicks
(74) *Attorney, Agent, or Firm* — Grossman Tucker Perreault & Pfleger, PLLC

(57) ABSTRACT

The invention relates to a liquid container (1) for a motor vehicle, in particular a fuel container (1), having at least one filler tube (4) and having operational and filling ventilation, comprising at least one operational ventilation line (7) which is connected to an equalizing volume of the liquid container (1) and at least one filling ventilation opening (9) which opens into the equalizing volume. The fuel container (1) according to the invention is distinguished by the fact that the operational ventilation opening (7) is connected to the filler tube (4) outside the container volume, in a manner which forms a siphon (8), and that the connection of the operational ventilation line (7) to the filler tube (4) is arranged in such a way that liquid is collected in the siphon (8) during each filling operation and closes the operational ventilation line (7).

9 Claims, 1 Drawing Sheet

(56) References Cited

U.S. PATENT DOCUMENTS

| | | | |
|---|---|---|---|
| 5,704,337 A | 1/1998 | Stratz et al. | |
| 6,732,759 B2 * | 5/2004 | Romanek et al. | 137/588 |
| 7,191,810 B2 | 3/2007 | Ganachaud et al. | |

FOREIGN PATENT DOCUMENTS

| | | |
|---|---|---|
| DE | 102006004630 A1 | 8/2007 |
| DE | 102008044167 A1 | 6/2010 |
| FR | 2692207 A1 | 12/1993 |
| FR | 2728200 A1 | 6/1996 |
| GB | 2188913 A | 10/1987 |
| JP | S5347420 U | 4/1978 |
| JP | S61141127 U | 9/1986 |
| JP | H0211420 A | 1/1990 |

OTHER PUBLICATIONS

English language PCT Written Opinion mailed Nov. 23, 2012, received in corresponding PCT Application No. PCT/EP12/03139, 6 pgs.

English language PCT International Preliminary Report on Patentability issued Jun. 18, 2013, received in corresponding PCT Application No. PCT/EP12/03139, 4 pgs.

English language summary of the Japanese Notification of Reasons for Refusal mailed Jan. 13, 2015, received in corresponding Japanese Patent Application No. 2014-521987, 2 pgs.

* cited by examiner

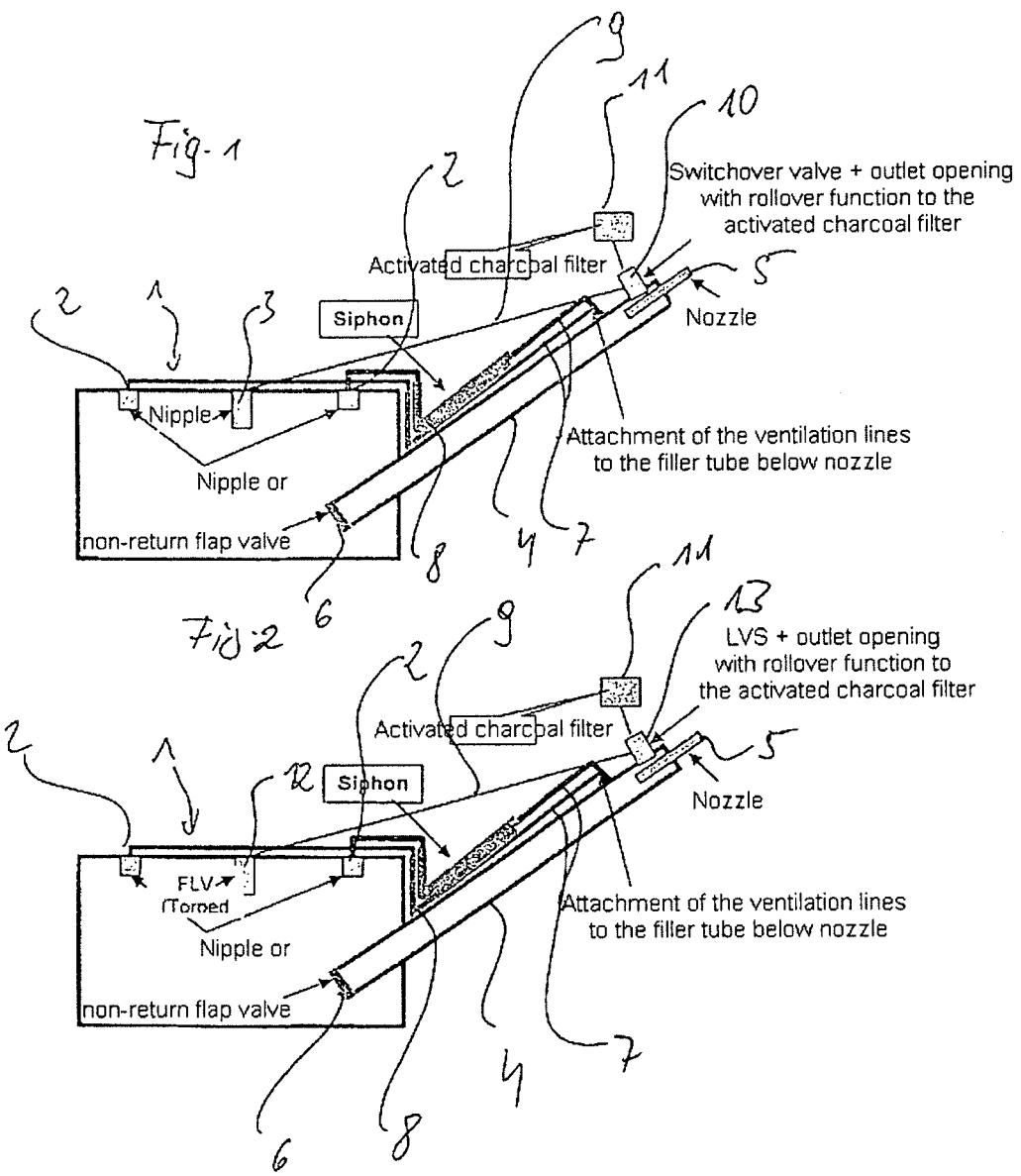

LIQUID CONTAINER FOR A MOTOR VEHICLE, IN PARTICULAR A FUEL CONTAINER

The invention relates to a liquid container for a motor vehicle, in particular a fuel container, having at least one filler tube and having means for operational and filling ventilation, comprising at least one operational ventilation line which is connected to an equalizing volume of the liquid container and at least one filling ventilation opening which opens into the equalizing volume.

The invention relates, in particular, to a liquid container for a motor vehicle made from thermoplastic, such as a fuel container or a liquid container for a liquid exhaust-gas additive.

Liquid containers of this type usually comprise at least one filling ventilation valve and a plurality of operational ventilation valves which are inserted into the top container wall in the installed position and communicate with an equalizing volume of the liquid container. It should not be possible to fill the said equalizing volume in the liquid container, since the volume is required in order to compensate for temperature-induced volumetric changes of a liquid, such as fuel or aqueous urea solution. The compensating volume will usually be situated at the top in the installed position of the liquid container. In the top container wall, depending on the geometry of the container, one or more ventilation valves will be connected to one or more top ventilation points in the installed position, which ventilation valves are routed via ventilation lines to a filter, in particular a fuel vapour filter. Via the ventilation valves which can theoretically be open in the pressureless state during operation of the motor vehicle, the gas volume which accumulates on account of driving dynamics and temperature changes above the liquid level will be discharged out of the liquid container to the atmosphere via a fuel vapour filter which is configured as an activated charcoal filter. In the context of this application, equalizing volume is to be understood as the volume which remains free above the maximum possible filling level or liquid level in the liquid container.

The volumetric gas flow which is displaced by the introduced liquid during the filling operation of the motor vehicle is, however, considerably greater than the volumetric gas flow which accumulates during operation of the motor vehicle. The said volumetric gas flow is usually discharged from the liquid container via a filling ventilation valve. In the case of liquid containers which are provided for motor vehicles which are marketed in Europe, at least a substantial part of the volumetric gas flow which is displaced from the container during the filling operation is discharged via the filling ventilation line and via the filler tube of the liquid container, an extraction means being provided at the nozzle for the displaced volumetric gas flow.

In the case of motor vehicles which are provided for the US market, the entire volumetric gas flow which accumulates during the filling operation is as a rule discharged to the atmosphere in a manner which is purified via the fuel vapour filter. Normally provided as filling ventilation valve is a valve having a float body which extends into the volume of the liquid container to such an extent that the liquid level which rises during the filling operation can lift the float body in the filling ventilation valve, with the result that the filling ventilation opening is closed. If the filling operation is continued, the equalizing volume in the liquid container can no longer be ventilated, which results in a pressure rise in the liquid container and a rise in the column of liquid in the filler tube. If the column of liquid in the filler tube rises to such an extent that it closes a snifter bore on the nozzle, the nozzle switches off and the filling operation is terminated.

The functionality of the filling ventilation valve and of the switchover valve on the nozzle is ensured only when the equalizing volume in the liquid container cannot be ventilated via the remaining ventilation points/operational ventilation points and can be filled as a result. To this end, it is required as a rule to equip the operational ventilation valves of the liquid container with a pressure-holding function, with the result that overfilling of the system is not possible at any rate.

A pressure-holding function on the filling ventilation valves can be brought about, for example, by spring-loaded valve bodies. It is also known to switch the filling ventilation valves as a function of the operating state of the motor vehicle (filling or driving operation). A switchover of this type can be brought about, for example, via a switchover valve which can be actuated by the nozzle.

The closing forces which are required for the realization of a pressure-holding function are comparatively small, especially since high differential pressures with respect to atmosphere are not desired in principle for a very wide range of reasons. In the case of the known systems, it can therefore occur that, after initial switching off of the nozzle, a slight positive pressure which prevails, for instance, in the equalizing volume is dissipated, with the result that slight further filling until a renewed switching-off operation is then possible. Systematic filling of this type of the equalizing volume, which filling frequently also occurs on account of a lack of knowledge of the users of the system is at any rate not desirable.

Finally, the realizing of the pressure-holding function is comparatively complicated in the case of the known systems.

A liquid container in the form of a fuel container according to the preamble of claim 1 is for instance known from EP 0 206 874 A1. EP 0 206 874 A1 discloses a fuel tank of synthetic material for motor vehicles which has an expansion and venting system and consists of a main filling volume, which is extended outwardly by an expansion chamber and in which a filling pipe is housed. At the upper part of the filling pipe a gas evacuation line is tabbed including an expansion chamber and a siphon. A line further joins the upper part of an inlet pipe to another extension chamber, forming a circuit with a hydraulic check valve. The ventilation system of this fuel tank is designed such that the main enclosure of the fuel tank may be completely filled with fuel, an expansion volume is defined by a separate expansion vessel enclosing the filler neck.

This teaching follows a completely different design concept, as with conventional fuel tank designs the expansion volume of the fuel tank is normally provided within the main filling volume of the fuel tank. At least theoretically, this design has the drawback that in a tilted position of the vehicle depending of the filling level of the fuel tank a ventilation of the system might not be possible.

Another fuel tank including a ventilation system is for instance disclosed in DE 195 24 254 C1. This reference discloses a fuel tank with a filler neck of plastic material, which filler neck is connected at one end to the fuel tank and has a filler opening at its other end, a vent pipe extending from the tank to the filler opening, an adsorber chamber with a chamber opening and a fuel vapour conduit providing for communication of the tank with the adsorber chamber are integrally formed with the filler neck in a single blow molding step, the adsorber chamber, after being filled with a back of activated carbon, being closed by a lid which carries a regeneration valve and covers the chamber opening.

Fuel tanks with similar ventilation systems are for instance known from FR 2 692 207 A1, FR 2 728 200 A, and GB 2 188 913 A.

It is thus an object of the present invention to provide a liquid container according to the preamble of claim 1, which includes means for filling level shut-off, which are improved in terms of simplicity.

These and other objects are achieved by the features of claim 1. Advantageous embodiments may be derived from the dependent claims.

The operational ventilation line is connected to the filler tube in a region which is situated below the outlet-side end of the nozzle which is pushed into the filler tube. The filler tube is expediently configured in this region in such a way that a part flow of the liquid passes into the operational ventilation line and accumulates in the siphon which is formed by the operational ventilation line. If, during a filling operation of the motor vehicle, the filling ventilation valve is closed by the liquid which is present in the container, ventilation of the container via the operational ventilation line can take place only counter to the liquid column which is present in the siphon. As a result, a pressure-holding function is ensured by way of very simple means. The solution according to the invention manages completely without valves and other movable parts. Emptying of the filling ventilation line and of the siphon which is formed by it takes place automatically during operation of the motor vehicle when the liquid column which is present in the filler tube drops, with the result that, during operation of the motor vehicle, the relevant filling ventilation line is open in a pressureless state to the filter, such as a fuel vapour filter. Thus, the desired pressureless operation of the liquid container can be realized by way of very simple means. The functional reliability of the system comprising operational ventilation and filling switch-off can be achieved by a suitable selection of the cross section of the operational ventilation line in proportion to the cross section of the filler tube.

Separate ventilation paths, that is to say separate ventilation lines, firstly for the operational ventilation and secondly for the filling ventilation are expediently provided in each case.

In principle, at least one operational ventilation line can be connected to the equalizing volume of the liquid container via a valve without a pressure-holding function. A valve of this type can be, for example, a simple float valve which ensures closure of the liquid container in the case of a rollover (rollover valve).

A plurality of operational ventilation valves can be connected to a single operational ventilation collecting line which likewise opens into the filler tube, in a manner which forms a siphon. In the simplest case, all the filling ventilation valves can be configured as nipples without valve body. In this case, the rollover safety means would then be ensured by means of a corresponding valve in an operational ventilation collecting line. A rollover safety means of this type in the form of a rollover valve can be realized, for example, using a switchover valve which is connected upstream of the fuel vapour filter. A switchover valve of this type can also be connected to the filling ventilation line. Instead of a filling ventilation valve which is arranged in the liquid container, merely a dip tube or a nipple can be provided, for example, which is closed by the liquid level which rises during the filling operation, with the result that, as a consequence, a pressure rise in the liquid container is brought about.

In one variant of the liquid container according to the invention, it is provided that at least one operational ventilation line is connected with an open line end which is configured as a ventilation nipple to the equalizing volume.

In a further variant of the liquid container according to the invention, it is provided that a plurality of ventilation lines are connected at different points of the liquid container to the equalizing volume of said liquid container, which ventilation lines open into the filler tube so as to in each case form a siphon.

The filler tube can be connected to a filter, such as a fuel vapour filter, for example via at least one droplet separator and/or one bubble container. As an alternative, the filler tube, as described above, can be connected to a filter via at least one switchover valve.

The liquid container is expediently configured as a fuel container. As an alternative, the liquid container can also be configured, for example, as a storage container for a liquid exhaust-gas additive. A liquid exhaust-gas additive of this type is, for example, the aqueous urea solution which is injected into the exhaust-gas system in the case of the SCR (selective catalytic reduction) process.

In the following text, the invention will be explained using two exemplary embodiments which are shown in the drawings, in which:

FIG. 1 shows a diagrammatic, highly simplified illustration of a fuel container according to a first exemplary embodiment of the invention, and FIG. 2 shows an illustration of the fuel container according to a second exemplary embodiment of the invention.

The fuel container 1 which is shown in FIG. 1 is configured as a fuel container made from thermoplastic for a motor vehicle. It is shown in the drawing with a highly simplified geometry/contour. The invention is to be understood such that the fuel container 1 can have a comparatively complex contour/design with a plurality of volumes for fuel which are connected to one another. The said fuel volumes can also be arranged on different levels in relation to the installed position in the motor vehicle. Each fuel volume comprises at least one operational ventilation connection 2.

Even in the case of a comparatively simply designed fuel container 1 as is shown, for example, in the figures, a plurality of operational ventilation connections 2 are required in some circumstances, in order, for example, to also ensure operational ventilation in the case of a sloping position/lateral inclination of the motor vehicle. Furthermore, the fuel container 1 comprises a filling ventilation connection 3 and a filler tube 4. The filler tube 4 is provided in a usual way with a filler head which comprises, for example, a filler funnel for guiding the nozzle 5, what is known as an unleaded flap and possibly earthing means. That end of the filler tube 4 which opens into the fuel container 1 can be closed, for example, by way of a non-return flap valve 6 which prevents a rejection surge of the fuel out of the fuel container 1 in the event of pressure surges.

In that variant of the fuel container 1 which is shown in FIG. 1, the operational ventilation connections 2 are configured as nipples which are connected to operational ventilation lines 7 which are laid outside the fuel container. The drawing shows two operational ventilation connections 2 which are in each case connected to an operational ventilation line 7. The operational ventilation lines 7 are laid parallel to one another so to in each case form a siphon 8 and are connected to the filler tube 4 in the upper region of the latter on the side which faces away from the fuel container 1. The connection of the operational ventilation lines 7 to the filler tube 4 is situated just below the opening of a nozzle 5 which is pushed into the filler tube 4, in such a way that a part flow of the fuel can pass into the operational ventilation lines 7 during the filling operation. A corresponding cross-sectional configuration of the filler tube 4 is possibly required in this region to this end.

For example, the filler tube 4 can have, in the region of the connection of the operational ventilation lines 7, a screen, a funnel-shaped constriction or flow baffles which are arranged in the cross section of the filler tube, with the result that the entry of liquid fuel into the operational ventilation lines 7 is ensured in such a way that liquid fuel 8 can accumulate in the siphon 8 and can close the relevant operational ventilation line 7.

The cross section of the filler tube 4 is a multiple of the cross section of the operational ventilation lines 7. The cross-sectional conditions are set in such a way that effective filling ventilation switch-off and subsequent draining of the operational ventilation lines 7 are ensured.

In that variant of the fuel container 1 which is shown in FIG. 1, the filling ventilation connection 3 is also configured in the form of a simple nipple which is connected via a filling ventilation line 9 to a switchover valve 10 on the filler head of the filler tube 4. A fuel vapour filter 11 is connected downstream of the switchover valve 10.

The filling operation is initiated by introduction of the nozzle 5 into the filler tube 4. The fuel level in the fuel container 1 then rises. Here, the gas volume which is present above the fuel level is displaced out of the fuel container 1. At the beginning of the filling operation, liquid fuel has collected in the siphon 8 of the respective operational ventilation line 7, with the result that the operational ventilation lines 7 are closed for the displaced volumetric gas flow. The latter is fed via the filling ventilation line 9 and the switchover valve 10 to the fuel vapour filter 11. Here, the complete volumetric gas flow does not have to be routed via the fuel vapour filter 11; a part can be recirculated through the filler tube 4 and/or can be extracted at the nozzle 5. The liquid level in the fuel container 1 rises until it wets/closes the nipple and/or the filling ventilation connection 3. The filling ventilation connection 3 is arranged at the level below the operational ventilation connections 2. Closure of the filling ventilation line 9 brings about a pressure rise in the fuel container during continuous filling, with the consequence that the column of liquid rises in the filler tube 4 until it reaches the nozzle 5 and brings about a switch-off of the nozzle 5. After removal of the nozzle 5 out of the opening region of the filler tube 4, the latter is closed by way of a closure cover. Here, the nozzle 5 actuates the switchover valve 10. In the previously described case, the switchover valve is opened, with the result that the filling ventilation path is opened. The operational ventilation lines 7 communicate via the filler tube 4 and the switchover valve 10 with the fuel vapour filter 11, the filler tube 4 serving as a liquid trap for the fuel particles (liquid carry over) entrained during the filling ventilation operation.

Immediately after the end of the filling operation, liquid fuel is still present in the siphon 8 of the operational ventilation line 7. When fuel is removed from the fuel container 1 as a result of the operation of the internal combustion engine, the liquid level in the filler tube 4 will drop. To the same extent, the liquid fuel which has accumulated in the siphon 8 of the operational ventilation lines 7 is drawn out of the operational ventilation lines 7 by way of the falling liquid level in the filler tube 4, with the result that finally the path from the operational ventilation connection 2 via the operational ventilation line 7 through the filler tube 4 to the fuel vapour filter 11 is open in a pressureless state during operation of the motor vehicle. The switchover valve 11 comprises a float body which ensures the rollover function/rollover safety means for shutting off the path to the fuel vapour filter 11 in the case of a rollover.

That variant of the fuel container 1 which is shown in FIG. 2 differs from that variant of the fuel container which is shown in FIG. 1 to the extent that the filling ventilation connection 3 comprises a filling ventilation valve 12 having a valve body which is configured as a float body. Moreover, merely a bubble container 13 without switching function is provided with a rollover valve on the filler head, that is to say at the filling-side end of the filler tube 4. Otherwise, the method of operation of the ventilation system on the fuel container which is shown in FIG. 2 corresponds to the method of operation of the fuel container which is shown in FIG. 1.

LIST OF REFERENCE NUMERALS

1 Fuel container
2 Operational ventilation connection
3 Filling ventilation connection
4 Filler tube
5 Nozzle
6 Non-return flap valve
7 Operational ventilation line
8 Siphon
9 Filling ventilation line
10 Switchover valve
11 Fuel vapour filter
12 Filling ventilation valve
13 Bubble container

What is claimed is:

1. Liquid container for a motor vehicle having at least one filler tube and having operational and filling ventilation, comprising at least one operational ventilation line which is connected to an equalizing volume of the liquid container, and at least one filling ventilation line, wherein the operational ventilation line is connected to the filler tube outside the container volume, in a manner which forms a siphon and wherein the connection of the operational ventilation line to the filler tube is situated below an outlet-side end of a nozzle which is pushed into the filler tube such that liquid is collected in the siphon during each filling operation and closes the operational ventilation line, characterized in that the filling ventilation line opens into the equalizing volume.

2. Liquid container according to claim 1, characterized in that separate ventilation paths firstly for the operational ventilation and secondly for the filling ventilation are provided.

3. Liquid container as claimed in claim 1, characterized in that the at least one operational ventilation line is connected to the equalizing volume of the liquid container via a valve without a pressure-holding function.

4. Liquid container according to claim 1, characterized in that at least one operational ventilation line is connected with an open line end which is configured as a ventilation nipple to the equalizing volume, without a valve being connected in between.

5. Liquid container according to claim 1, characterized in that a plurality of ventilation lines are connected at different points to the equalizing volume of the liquid container, which ventilation lines are connected to the filler tube so as to in each case form a siphon.

6. Liquid container according to claim 1, characterized in that the filler tube is connected to a fuel vapour filter via at least one droplet separator and/or bubble container.

7. Liquid container according to claim 1, characterized in that the filler tube is connected to a fuel vapour filter via at least one switchover valve.

8. Liquid container according to claim 1, characterized in that the liquid container is configured as a fuel container.

9. Liquid container according to claim 1, characterized in that the liquid container is configured as a storage container for a liquid exhaust-gas additive.

\* \* \* \* \*